United States Patent
Duan et al.

(10) Patent No.: US 12,475,549 B2
(45) Date of Patent: Nov. 18, 2025

(54) DIAPHRAGM DETECTION METHOD, DEVICE AND APPARATUS

(71) Applicant: CONTEMPORARY AMPEREX TECHNOLOGY (HONG KONG) LIMITED, Hong Kong (CN)

(72) Inventors: Pengfei Duan, Ningde (CN); Dajun Ni, Ningde (CN); Jun Hu, Ningde (CN); Shiping Feng, Ningde (CN); Qing Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 320 days.

(21) Appl. No.: 18/467,430

(22) Filed: Sep. 14, 2023

(65) Prior Publication Data

US 2024/0005474 A1 Jan. 4, 2024

Related U.S. Application Data

(63) Continuation of application No. PCT/CN2022/085253, filed on Apr. 6, 2022.

(51) Int. Cl.
*G06T 7/00* (2017.01)
*G06T 7/11* (2017.01)
*G06T 7/13* (2017.01)

(52) U.S. Cl.
CPC .............. *G06T 7/0004* (2013.01); *G06T 7/11* (2017.01); *G06T 7/13* (2017.01); *G06T 2207/30108* (2013.01)

(58) Field of Classification Search
CPC . G06T 7/0004; G06T 7/11; G06T 7/13; G06T 2207/30108
See application file for complete search history.

(56) References Cited

U.S. PATENT DOCUMENTS

2019/0341658 A1  11/2019  Han et al.

FOREIGN PATENT DOCUMENTS

| CN | 201873363 U | 6/2011 | |
|---|---|---|---|
| CN | 110542361 A | 12/2019 | |
| CN | 110866920 A | 3/2020 | |
| CN | 112053326 A * | 12/2020 | ........ H01M 10/0583 |
| CN | 112330623 A | 2/2021 | |
| CN | 112508838 A | 3/2021 | |
| CN | 112577421 A | 3/2021 | |

(Continued)

OTHER PUBLICATIONS

The Japan Patent Office (JPO) Notice of Reasons for Refusal for Application No. 2023-552363 Oct. 29, 2024 6 Pages (including translation).

(Continued)

*Primary Examiner* — Kenny A Cese
(74) *Attorney, Agent, or Firm* — Anova Law Group, PLLC

(57) ABSTRACT

A diaphragm detection method includes acquiring a target image of an electrode plate to be detected. The electrode plate to be detected includes an anode electrode plate and diaphragms respectively stacked on two sides of the anode electrode plate. The method further includes performing image processing on the target image to determine a target image region in the target image, and performing diaphragm misalignment detection on the electrode plate to be detected based on the target image region.

11 Claims, 3 Drawing Sheets

(56) References Cited

FOREIGN PATENT DOCUMENTS

| | | |
|---|---|---|
| CN | 113203745 A | 8/2021 |
| JP | 2015005332 A | 1/2015 |
| JP | 2018113198 A | 7/2018 |
| WO | 2015087631 A1 | 6/2015 |

OTHER PUBLICATIONS

The European Patent Office (EPO) The Extended European Search Report for Application No. 22927581.3 Jul. 5, 2024 10 Pages.
The World Intellectual Property Organization (WIPO) International Search Report for PCT/CN2022/085253 Dec. 16, 2022 7 pages (including English translation).

* cited by examiner

DIAPHRAGM DETECTION METHOD, DEVICE AND APPARATUS

CROSS-REFERENCE TO RELATED APPLICATION

This application is a continuation of International Application No. PCT/CN2022/085253, filed on Apr. 6, 2022, the entire content of which is incorporated herein by reference.

TECHNICAL FIELD

The present application relates to the technical field of batteries, and in particular, to a diaphragm detection method, device and apparatus.

BACKGROUND

With the rapid development of battery technology, the application of batteries (such as lithium batteries, etc.) is becoming more and more popular. Production quality of an electrode plate to be detected, which is one of the basic components of a battery, has a great influence on the performance of the battery, for example, has an influence on an energy density, capacity and service life, etc., of the battery. In a lamination process of the electrode plate to be detected, usually diaphragms are superimposed respectively on two sides of an anode electrode plate, so as to achieve insulation between the anode electrode plate and a cathode electrode plate through the diaphragms.

The diaphragms superimposed on two sides of the anode electrode plate are prone to misalign, which may lead to a decrease in battery performance. In order to ensure the quality of the battery, it is needed to perform misalignment detection of the diaphragms superimposed on two sides of the anode electrode plate, to remove the electrode plate to be detected that does not meet the requirements due to misalignment after superimposing.

SUMMARY

In view of the above problems, the present application provides a diaphragm detection method, device and apparatus.

In a first aspect, an embodiment of the present application provides a diaphragm detection method, including: acquiring a target image of an electrode plate to be detected, wherein the electrode plate to be detected includes an anode electrode plate and diaphragms respectively stacked on two sides of the anode electrode plate; performing image processing on the target image to determine a target image region in the target image; and performing misalignment detection on the diaphragms in the electrode plate to be detected based on the target image region.

In the embodiments of the present application, the target image of the electrode plate to be detected is acquired, image processing is performed on the target image to determine a target image region corresponding to the diaphragms in the target image, and based on the target image region, misalignment detection is performed on the diaphragms in the electrode plate to be detected. In this way, based on the image region corresponding to the diaphragms in the image of the electrode plate to be detected, it is possible to detect whether the diaphragms in the electrode plate to be detected are misaligned. Compared with determining the misalignment of the diaphragms through human experience, not only the accuracy of detection can be improved, but also the detection efficiency can be improved.

In some implementations, the performing diaphragm misalignment detection on the electrode plate to be detected based on the target image region includes: acquiring a number of diaphragm image sub-regions in the target image region; determining a diaphragm misalignment result of the electrode plate to be detected based on the number of diaphragm image sub-regions in the target image region, wherein the diaphragm misalignment result is configured to indicate whether the diaphragms of the electrode plate to be detected are misaligned.

In the implementations, by acquiring a number of diaphragm image sub-regions in the target image region, and determining a diaphragm misalignment result of the electrode plate to be detected based on the number of diaphragm image sub-regions in the target image region, in the process of detecting whether the diaphragms of the electrode plate to be detected are misaligned, it is possible to make the detection process simpler, thereby saving computing resources and improving the detection speed.

In some implementations, the acquiring a number of diaphragm image sub-regions in the target image region includes: performing grayscale image segmentation processing on the target image region to obtain a number N of diaphragm image sub-regions with different grayscales, where N is a positive integer, wherein N is the number of diaphragm image sub-regions in the target image.

In the implementations, by performing grayscale image segmentation processing on the target image region, and determining the number of diaphragm image sub-regions according to different grayscales in the target image region, the process of determining the number of diaphragm image sub-regions in the target image is enabled to be simpler and more accurate.

In some implementations, the determining a diaphragm misalignment result of the electrode plate to be detected based on the number of diaphragm image sub-regions in the target image region includes: under a condition that the number of diaphragm image sub-regions in the target image is a first preset number, determining that the diaphragm misalignment result of the electrode plate to be detected is a first sub-result, wherein the first sub-result is configured to indicate that the diaphragms of the electrode plate to be detected are not misaligned; and under a condition that the number of diaphragm image sub-regions in the target image is a second preset number, determining that the diaphragm misalignment result of the electrode plate to be detected is a second sub-result, wherein the second preset number is different from the first preset number, and the second sub-result is configured to indicate that the diaphragms of the electrode plate to be detected are misaligned.

In the implementations, by comparing the number of diaphragm image sub-regions in the target image with the first preset number and the second preset number respectively, the first sub-result and the second sub-result respectively configured to indicate that whether the diaphragms of the electrode plate to be detected are misaligned can be respectively obtained, thereby making it easier and faster to determine whether the diaphragms of the electrode plate to be detected are misaligned.

In some implementations, the method further includes: under a condition that the number of diaphragm image sub-regions in the target image is a third preset number, outputting fault prompt information, wherein the third preset number is different from the first preset number and the second preset number.

In the implementations, under a condition that the number of diaphragm image sub-regions in the target image is a third preset number, a stacking device may output fault prompt information to remind for timely troubleshooting and reduce a defective rate of battery electrode plates.

In some implementations, after the performing diaphragm misalignment detection on the electrode plate to be detected based on the target image region, the method further includes: under a condition that it is detected that the diaphragms of the electrode plate to be detected are misaligned, determining a misalignment amount of the diaphragms in the electrode plate to be detected based on the target image region.

In the implementations, under a condition that it is detected that the diaphragms of the electrode plate to be detected are misaligned, the stacking device may determine a misalignment amount of the diaphragms in the electrode plate to be detected based on the target image region, so that the misalignment amount can intuitively reflect the misalignment of the electrode plate to be detected, and provide a reference for subsequent production.

In some implementations, under a condition that it is detected that the diaphragms of the electrode plate to be detected are misaligned, determining a misalignment amount of the diaphragms in the electrode plate to be detected based on the target image region includes: under a condition that it is detected that the diaphragms of the electrode plate to be detected are misaligned, determining a single-layer diaphragm region and a double-layer diaphragm region in diaphragm image sub-regions of the target image; performing edge detection on the single-layer diaphragm region and the double-layer diaphragm region respectively, to obtain a first region edge of the single-layer diaphragm region and a second region edge of the double-layer diaphragm region, wherein the second region edge corresponds to the first region edge; and determining a spacing between the first region edge and the second region edge as the misalignment amount of the diaphragms in the electrode plate to be detected.

In the implementations, under a condition that the diaphragms of the electrode plate to be detected are misaligned, by acquiring corresponding first region edge and second region edge in the single-layer diaphragm region and the double-layer diaphragm region of the target image, and determining a spacing between the first region edge and the second region edge as the misalignment amount of the diaphragms in the electrode plate to be detected, the determined misalignment amount of the diaphragms is enabled to be more accurate.

In some implementations, the method further includes: acquiring a third region edge, wherein the third region edge is an edge of an image region corresponding to the anode electrode plate or a cathode electrode plate in the target image, and the third region edge corresponds to the second region edge; and determining a spacing between the third region edge and the second region edge.

In the implementations, the stacking device may further acquire a third region edge of an image region corresponding to the anode electrode plate or a cathode electrode plate, and determine a spacing between the third region edge and the second region edge, so that a spacing between an edge of a double-layer diaphragm in the target image and an edge of the anode electrode plate or the cathode electrode plate can be determined, so as to control the production of the battery electrode plate based on the spacing.

In a second aspect, the present application further provides a diaphragm detection device, including: an image acquisition module configured to acquire a target image of an electrode plate to be detected, wherein the electrode plate to be detected includes an anode electrode plate and diaphragms respectively stacked on two sides of the anode electrode plate; an image region determination module configured to perform image processing on the target image to determine a target image region in the target image, wherein the target image region includes an image region corresponding to the diaphragms; and a misalignment detection module configured to perform diaphragm misalignment detection on the electrode plate to be detected based on the target image region.

In the embodiments of the present application, the target image of the electrode plate to be detected is acquired, image processing is performed on the target image to determine a target image region corresponding to the diaphragms in the target image, and based on the target image region, misalignment detection is performed on the diaphragms in the electrode plate to be detected. In this way, based on the image region corresponding to the diaphragms in the image of the electrode plate to be detected, it is possible to detect whether the diaphragms in the electrode plate to be detected are misaligned. Compared with determining the misalignment of the diaphragms through human experience, not only the accuracy of detection can be improved, but also the detection efficiency can be improved.

In some implementations, the misalignment detection module includes: a region number acquisition unit configured to acquire a number of diaphragm image sub-regions in the target image region; and a misalignment result determination unit configured to determine a diaphragm misalignment result of the electrode plate to be detected based on the number of diaphragm image sub-regions in the target image region, wherein the diaphragm misalignment result is configured to indicate whether the diaphragms of the electrode plate to be detected are misaligned.

In the implementations, by acquiring a number of diaphragm image sub-regions in the target image region, and determining a diaphragm misalignment result of the electrode plate to be detected based on the number of diaphragm image sub-regions in the target image region, in the process of detecting whether the diaphragms of the electrode plate to be detected are misaligned, it is possible to make the detection process simpler, thereby saving computing resources and improving the detection speed.

In some implementations, the region number acquisition unit is specifically configured to: perform grayscale image segmentation processing on the target image region to obtain a number N of diaphragm image sub-regions with different grayscales, where N is a positive integer, wherein N is the number of diaphragm image sub-regions in the target image.

In the implementations, by performing grayscale image segmentation processing on the target image region, and determining the number of diaphragm image sub-regions according to different grayscales in the target image region, the process of determining the number of diaphragm image sub-regions in the target image is enabled to be simpler and more accurate.

In some implementations, the misalignment result determination unit includes: a first sub-result determination sub-unit configured to: under a condition that the number of diaphragm image sub-regions in the target image is a first preset number, determine that the diaphragm misalignment result of the electrode plate to be detected is a first sub-result, wherein the first sub-result is configured to indicate that the diaphragms of the electrode plate to be detected are not misaligned; and a second sub-result determination sub-unit configured to: under a condition that the number of diaphragm image sub-regions in the target image is a second preset number, determine that the diaphragm misalignment result of the electrode plate to be detected is a second sub-result, wherein the second preset number is different from the first preset number, and the second sub-result is configured to indicate that the diaphragms of the electrode plate to be detected are misaligned.

In the implementations, by comparing the number of diaphragm image sub-regions in the target image with the first preset number and the second preset number respectively, the first sub-result and the second sub-result respectively configured to indicate that whether the diaphragms of the electrode plate to be detected are misaligned can be respectively obtained, thereby making it easier and faster to determine whether the diaphragms of the electrode plate to be detected are misaligned.

In some implementations, the device further includes: a prompt information output module configured to: under a condition that the number of diaphragm image sub-regions in the target image is a third preset number, output fault prompt information, wherein the third preset number is different from the first preset number and the second preset number.

In the implementations, under a condition that the number of diaphragm image sub-regions in the target image is a third preset number, a stacking device may output fault prompt information to remind for timely troubleshooting and reduce a defective rate of battery electrode plates.

In some implementations, the device further includes: a misalignment amount determination module configured to: under a condition that it is detected that the diaphragms of the electrode plate to be detected are misaligned, determine a misalignment amount of the diaphragms in the electrode plate to be detected based on the target image region.

In the implementations, under a condition that it is detected that the diaphragms of the electrode plate to be detected are misaligned, the stacking device may determine a misalignment amount of the diaphragms in the electrode plate to be detected based on the target image region, so that the misalignment amount can intuitively reflect the misalignment of the electrode plate to be detected, and provide a reference for subsequent production.

In some implementations, the misalignment amount determination module includes: a diaphragm region determination unit configured to: under a condition that it is detected that the diaphragms of the electrode plate to be detected are misaligned, determine a single-layer diaphragm region and a double-layer diaphragm region in the diaphragm image sub-regions of the target image; an edge detection unit configured to: perform edge detection on the single-layer diaphragm region and the double-layer diaphragm region respectively, to obtain a first region edge of the single-layer diaphragm region and a second region edge of the double-layer diaphragm region, wherein the second region edge corresponds to the first region edge; and a misalignment amount determination unit configured to: determine a spacing between the first region edge and the second region edge as the misalignment amount of the diaphragms in the electrode plate to be detected.

In the implementations, under a condition that the diaphragms of the electrode plate to be detected are misaligned, by acquiring corresponding first region edge and second region edge in the single-layer diaphragm region and the double-layer diaphragm region of the target image, and determining a spacing between the first region edge and the second region edge as the misalignment amount of the diaphragms in the electrode plate to be detected, the determined misalignment amount of the diaphragms is enabled to be more accurate.

In some implementations, the device further includes: an edge acquisition module configured to acquire a third region edge, wherein the third region edge is an edge of an image region corresponding to the anode electrode plate or a cathode electrode plate in the target image, and the third region edge corresponds to the second region edge; and a spacing determination module configured to determine a spacing between the third region edge and the second region edge.

In the implementations, the stacking device may further acquire a third region edge of an image region corresponding to the anode electrode plate or a cathode electrode plate, and determine a spacing between the third region edge and the second region edge, so that a spacing between an edge of a double-layer diaphragm in the target image and an edge of the anode electrode plate or the cathode electrode plate can be determined, so as to control the production of the battery electrode plate based on the spacing.

In a third aspect, the present application further provides a stacking device, including a processor, a memory, and programs or instructions stored in the memory and executable on the processor, wherein the programs or instructions, when executed by the processor, implement steps of the diaphragm detection method of the first aspect.

In a fourth aspect, the present application further provides a readable storage medium having stored programs or instructions thereon, wherein the programs or instructions, when executed by a processor, implement steps of the diaphragm detection method of the first aspect.

The above description is only an overview of the technical solutions of the present application. In order to better understand the technical means of the present application, it can be implemented according to the contents of the description, and in order to make the above and other purposes, features and advantages of the present application more obvious and understandable, specific implementations of the present application are specifically set forth below.

BRIEF DESCRIPTION OF THE DRAWINGS

Various other advantages and benefits will become apparent to those of ordinary skill in the art upon reading the following detailed description of some embodiments. The drawings are only for the purpose of illustrating some embodiments and are not to be considered as limiting the present application. Also, the same reference numerals are used to denote the same components throughout the drawings. In the drawings.

DETAILED DESCRIPTION

Figure 1:
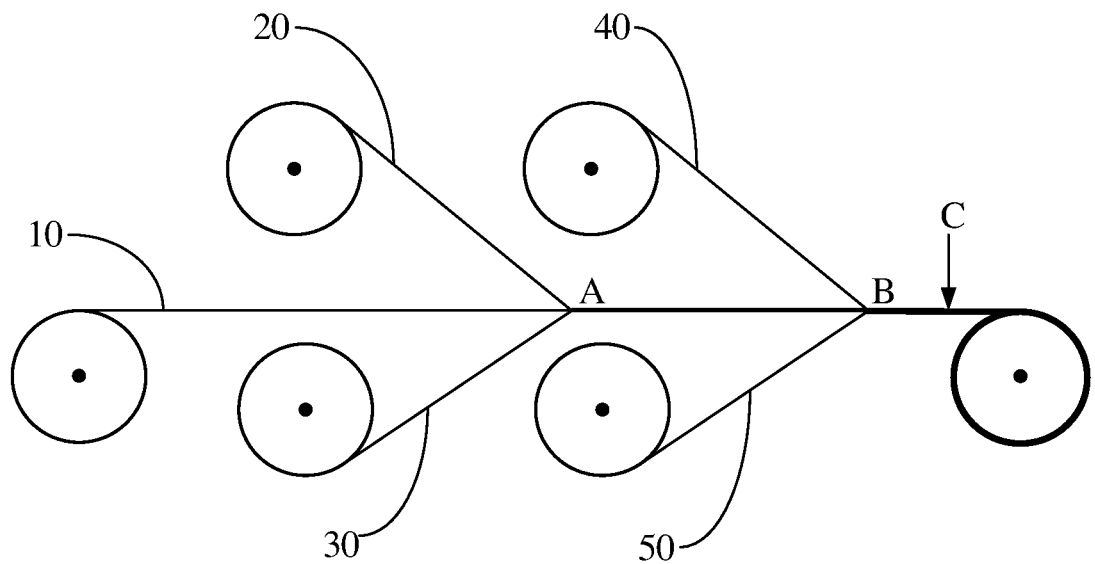
FIG. 1 is a schematic structural diagram of a stacking device provided by the present application.

Embodiments of technical solutions of the present application will be described in detail below in conjunction with the drawings. The following embodiments are only used to illustrate the technical solutions of the present application more clearly, and therefore are only examples, rather than limiting the protection scope of the present application.

Unless defined otherwise, all technical and scientific terms used herein have the same meanings as would generally understood by those skilled in the technical field of the present application. The terms used herein are for the purpose of describing specific embodiments only, and are not intended to limit the present application. The terms "comprising/including" and "having" in the specification and claims of the present application and the above brief description of the drawings and any variations thereof are intended to cover non-exclusive inclusion.

In the description of the embodiments of the present application, technical terms such as "first", "second", and the like are only used to distinguish different objects, and should not be interpreted as indicating or implying relative importance or implicitly indicating a number, a specific sequence, or a primary-subordinate relationship of the indicated technical features. In the description of the embodiments of the present application, "a plurality of" means two or more, unless otherwise specifically defined.

Reference to "an embodiment" herein means that a particular feature, structure or characteristic described in conjunction with an embodiment may be included in at least one embodiment of the present application. Appearances of the phrase in various places in the specification are not necessarily all referring to the same embodiment, nor are separate or alternative embodiments mutually exclusive of other embodiments. It is explicitly and implicitly understood by those skilled in the art that the embodiments described herein may be combined with other embodiments.

In the description of the embodiments of the present application, the term "and/or" is only a kind of association relationship that describes associated objects, which indicates that there may be three kinds of relationships. For example, A and/or B may indicate the following three cases: A exists alone, A and B exist simultaneously, and B exists alone. In addition, the character "/" herein generally represents that there is an "or" relationship between the associated objects preceding and succeeding the character "/" respectively.

In the description of the embodiments of the present application, the term "a plurality of" refers to two or more (including two), similarly, "a plurality of groups" refers to more than two groups (including two groups), and "a plurality of pieces" refers to two or more pieces (including two pieces).

In the description of the embodiments the present application, the orientation or position relationships indicated by technical terms such as "center", "longitudinal", "lateral", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationships shown in the drawings and are intended to facilitate the description of the present application and simplify the description only, rather than indicating or implying that the apparatus or element referred to must have a particular orientation or be constructed and operated in a particular orientation, and therefore are not to be interpreted as limiting the present application.

In the description of the embodiments of this application, unless otherwise specifically stated and limited, technical terms such as "installation", "connection", "connecting", and "fixing" should be interpreted in a broad sense, such as, a fixed connection, a detachable connection, or an integral connection; a mechanical connection, or an electrical connection; a direct connection, an indirect connection through an intermediate medium, or an internal connection of two elements or an interaction relationship between two elements. For those of ordinary skill in the art, the specific meanings of the foregoing terms in the embodiments of the present application can be understood according to specific circumstances.

In a production process of a battery electrode plate, the production is usually realized by a stacking device. As shown in FIG. 1, the stacking device firstly transports an anode electrode plate 10, a first diaphragm (also referred to as "upper diaphragm") 20 and a second diaphragm (also referred to as "lower diaphragm") 30 to a position A, and superimposes the anode electrode plate 10, the first diaphragm 20 and the second diaphragm 30 at the position A to form a lamination; then transports the lamination, a first cathode electrode plate (also referred to as "upper cathode electrode plate") 40 and a second cathode electrode plate (also referred to as "lower cathode electrode plate") 50 to a position B, and superimposes the first cathode electrode plate 40, the second cathode electrode plate 50 and the lamination to form a battery electrode plate.

At present, in the process of producing and superimposing to form the above-mentioned battery electrode plate by the above stacking device, the first diaphragm 20 and the second diaphragm 30 superimposed on two sides of the anode electrode plate 10 are prone to misalign, which may lead to a decrease in the performance of the battery. Therefore, in order to ensure the quality of the battery, it is needed to perform misalignment detection on the first diaphragm 20 and the second diaphragm 30, so as to remove the battery electrode plate that does not meet the requirements due to misalignment after superimposing. However, at present, the misalignment detection of the first diaphragm 20 and the second diaphragm 30 is usually determined through manual experience, which is prone to errors, resulting in low detection accuracy.

In view of the problem of low detection accuracy in the current misalignment detection of the first diaphragm 20 and the second diaphragm 30, the present application provides a diaphragm detection method, device and apparatus.

Figure 2:
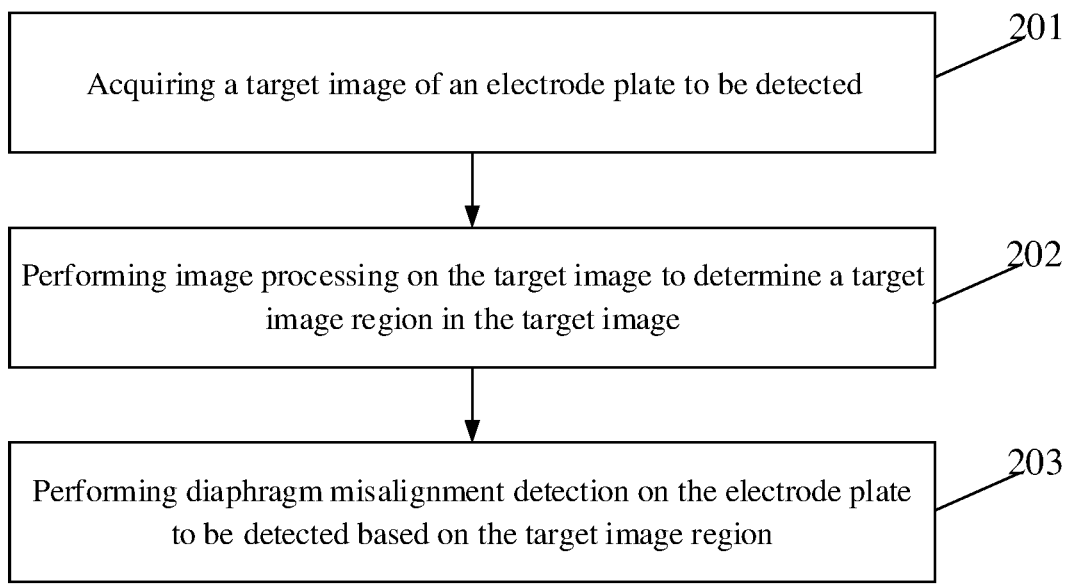
FIG. 2 is a schematic flowchart of an embodiment of a diaphragm detection method provided by the present application.

Please refer to FIG. 2, which is a schematic flowchart of an embodiment of a diaphragm detection method provided by the present application, and the diaphragm detection method is applied to the above stacking device. As shown in FIG. 2, the diaphragm detection method includes the following steps 201 to 203.

At step 201, a target image of an electrode plate to be detected is acquired, wherein the electrode plate to be detected includes an anode electrode plate and diaphragms respectively stacked on two sides of the anode electrode plate.

At step 202, image processing is performed on the target image to determine a target image region in the target image.

At step 203, misalignment detection is performed on the diaphragms in the electrode plate to be detected based on the target image region.

In the embodiments of the present application, the target image of the electrode plate to be detected is acquired, image processing is performed on the target image to determine a target image region corresponding to the diaphragms in the target image, and based on the target image region, misalignment detection is performed on the diaphragms in the electrode plate to be detected. In this way, based on the image region corresponding to the diaphragms in the image of the electrode plate to be detected, it is possible to detect whether the diaphragms in the electrode plate to be detected are misaligned. Compared with determining the misalignment of the diaphragms through human experience, not only the detection accuracy can be improved, but also the detection efficiency can be improved.

In the above step 201, during the production process of the electrode plate to be detected, the stacking device may acquire the target image of the produced electrode plate to be detected.

The electrode plate to be detected includes an anode electrode plate and diaphragms respectively stacked on two sides of the anode electrode plate. For example, the electrode plate to be detected may be a lamination formed by superimposing of the anode electrode plate 10, the first diaphragm 20 and the second diaphragm 30 at the position A; or the electrode plate to be detected may also be formed by a battery electrode plate formed by superimposing of the lamination, the first cathode electrode plate 40 and the second cathode electrode plate 50 at the position B.

For acquiring the target image of the electrode plate to be detected, a photographing device may be provided in the stacking device, and an image of the electrode plate to be detected may be captured in real time by the photographing device as the above target image.

For providing the photographing device in the stacking device, the photographing device may be placed at any position where the target image can be photographed, and the photographing device may be located at any transport position after a position where the electrode plate to be detected are formed by superimposing.

For example, the above-mentioned photographing device may be provided at any transport position between the position A and position B in the above-mentioned stacking device, so that an image of the above-mentioned lamination can be photographed as the above-mentioned target image; or the above-mentioned photographing device may be provided at any transport position after the position B in the above-mentioned stacking device, so that an image of the above-mentioned battery electrode plate can be photographed as the above-mentioned target image. Specifically, the photographing device may be provided at a position C as shown in FIG. 1.

Figure 3:
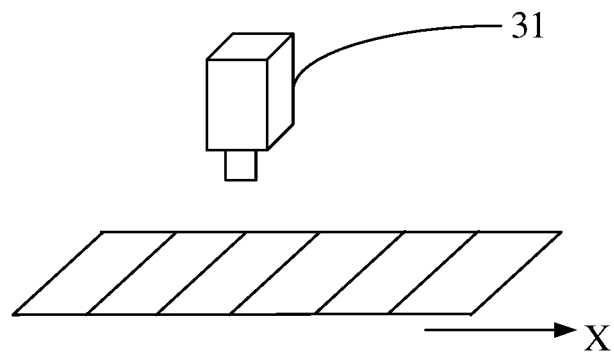
FIG. 3 is a schematic structural diagram of a photographing device in an embodiment of a diaphragm detection method provided by the present application.

For providing the above-mentioned photographing device in the stacking device, a photographing angle of the photographing device may be at any angle where the above-mentioned target image can be photographed. For example, as shown in FIG. 3, the above-mentioned photographing device 31 may be provided on either side of the electrode plate to be detected, and a photographing direction of the photographing device 31 is perpendicular to a transport direction X of the electrode plate to be detected; or it is also possible that the photographing direction of the photographing device 31 is set at a preset angle with the electrode plate to be detected, and a preset focal length may be 30° to 90°, etc.

In the above step 202, after acquiring the target image, the stacking device may perform image processing on the target image to determine a target image region (also referred to as "image region of interest") in the target image.

The above-mentioned target image region may be an image region corresponding to the diaphragms attached to two sides of the above-mentioned anode electrode plate. Specifically, the above-mentioned target image region may include a diaphragm image sub-region of the anode electrode piece and the diaphragm on one side (also referred to as "single-layer diaphragm region"), and may also include a diaphragm image sub-region of the anode electrode plate and the diaphragms on two sides (also referred to as "double-layer diaphragm region"), and so on.

Figure 4:
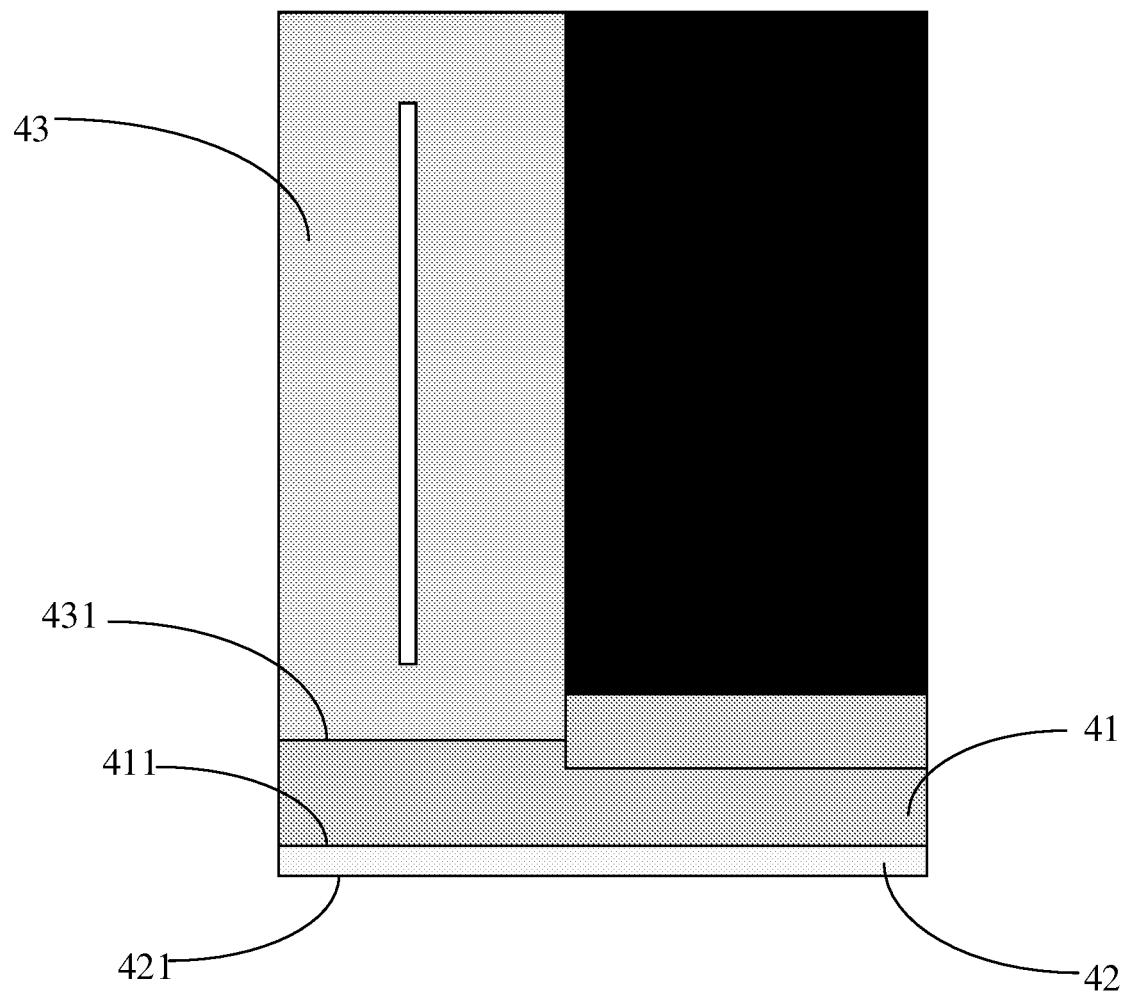
FIG. 4 is a schematic diagram of a target image in an embodiment of a diaphragm detection method provided by the present application.

For example, in the case that the electrode plate to be detected is a battery electrode plate, an image of the battery electrode plate (i.e. the target image) may be as shown in FIG. 4, the image may include a double-layer diaphragm region 41 and a single-layer diaphragm region 42, the double-layer diaphragm region 41 includes an image sub-region of superimposed anode electrode plate 10, first diaphragm 20 and second diaphragm 30; the single-layer diaphragm image region 42 includes an image sub-region of superimposed anode electrode plate 10 and first diaphragm 20 or superimposed anode electrode plate 10 and second diaphragm 30.

The above-mentioned image processing of the target image to determine the target image region in the target image may be to perform image graying on the target image through a pre-configured image processing algorithm, and according to different grayscales of each image region in the image, the grayed image is divided into image regions to obtain the above target image region.

The above-mentioned image graying of the target image may be to gray all the image regions of the target image; or it may also be to locate a diaphragm image region first, and the diaphragm image region is an image region containing at least one layer of diaphragm, and then the diaphragm image region is grayed, and finally the grayed diaphragm image region is segmented.

In the above step 203, after determining the target image region in the above-mentioned target image, the stacking device may perform misalignment detection on the diaphragms in the electrode plate to be detected based on the target image region.

The above-mentioned misalignment detection of the diaphragms in the electrode plate to be detected based on the target image region may first identify whether there is a single-layer diaphragm region in the target image region through a pre-configured image recognition algorithm, and determine that the diaphragms in the electrode plate to be detected are misaligned under a condition that there is a single-layer diaphragm region, and determine that the diaphragms in the electrode plate to be detected are not misaligned under a condition that there is no single-layer diaphragm region.

For example, after the stacking device determines image regions of interest of the electrode plate to be detected, the stacking device may divide the image regions of interest according to grayscales in the image to obtain at least one image sub-region. In the at least one image sub-region, the stacking device determines whether there is a single-layer diaphragm region whose grayscale value is close to or equal to a preset grayscale value according to the grayscale value of each image sub-region, and the preset grayscale value is configured to indicate that the image sub-region is an image region of a single-layer diaphragm. If there is a single-layer diaphragm region whose grayscale value is close to or equal to the preset grayscale value, then it is determined that the diaphragms of the electrode plate to be detected are misaligned; if there is no single-layer diaphragm region whose grayscale value is close to or equal to the preset grayscale value, it is determined that the diaphragms of the electrode plate to be detected are not misaligned.

In some implementations, the performing diaphragm misalignment detection on the electrode plate to be detected based on the target image region includes: acquiring a number of diaphragm image sub-regions in the target image region; determining a diaphragm misalignment result of the electrode plate to be detected based on the number of diaphragm image sub-regions in the target image region, wherein the diaphragm misalignment result is configured to indicate whether the diaphragms of the electrode plate to be detected are misaligned.

In the implementations, by acquiring a number of diaphragm image sub-regions in the target image region, and determining a diaphragm misalignment result of the electrode plate to be detected based on the number of diaphragm image sub-regions in the target image region, in the process of detecting whether the diaphragms of the electrode plate to be detected are misaligned, it is possible to make the detection process simpler, thereby saving computing resources and improving the detection speed.

The above-mentioned acquisition of the number of diaphragm image sub-regions in the target image region may be performed by using an image processing algorithm to detect contours of different image sub-regions in the above-mentioned target image region, and determine a number of image sub-regions with different contours as the above-mentioned number of diaphragm image sub-regions in the target image region.

In some implementations, the acquiring a number of diaphragm image sub-regions in the target image region includes: performing grayscale image segmentation processing on the target image region to obtain a number N of diaphragm image sub-regions with different grayscales, where N is a positive integer, wherein N is the number of diaphragm image sub-regions in the target image.

In the implementations, by performing grayscale image segmentation processing on the target image region, and determining the number of diaphragm image sub-regions according to different grayscales in the target image region, the process of determining the number of diaphragm image sub-regions in the target image is enabled to be simpler and more accurate.

In some implementations, the determining a diaphragm misalignment result of the electrode plate to be detected based on the number of diaphragm image sub-regions in the target image region includes: under a condition that the number of diaphragm image sub-regions in the target image is a first preset number, determining that the diaphragm misalignment result of the electrode plate to be detected is a first sub-result, wherein the first sub-result is configured to indicate that the diaphragms of the electrode plate to be detected are not misaligned; and under a condition that the number of diaphragm image sub-regions in the target image is a second preset number, determining that the diaphragm misalignment result of the electrode plate to be detected is a second sub-result, wherein the second preset number is different from the first preset number, and the second sub-result is configured to indicate that the diaphragms of the electrode plate to be detected are misaligned.

In the implementations, by comparing the number of diaphragm image sub-regions in the target image with the first preset number and the second preset number respectively, the first sub-result and the second sub-result respectively configured to indicate that whether the diaphragms of the electrode plate to be detected are misaligned can be respectively obtained, thereby making it easier and faster to determine whether the diaphragms of the electrode plate to be detected are misaligned.

The above-mentioned first preset number and the above-mentioned second preset number may be different preset numbers, and under a condition that the number of diaphragm image sub-regions is the first preset number, the diaphragms of the electrode plate to be detected are not misaligned, that is, the diaphragms superimposed on two sides of the anode electrode plate in the electrode plate to be detected are aligned with respect to the anode electrode plate; and under a condition that the number of diaphragm image sub-regions in the target image is the second preset number, the diaphragms of the electrode plate to be detected are misaligned, that is, the diaphragms superimposed on two sides of the anode electrode plate in the electrode plate to be detected are misaligned with respect to the anode electrode plate.

For example, under a condition that the above-mentioned first diaphragm 20 and second diaphragm 30 are aligned with respect to the above-mentioned anode electrode plate 10, in an image captured by the photographing device 31 as shown in FIG. 3, one or more image regions corresponding to the diaphragms only include the double-layer diaphragm region 41 as shown in FIG. 4, that is, the above-mentioned first preset number may be set as 1, then it is determined that the diaphragms of the electrode plate to be detected are not misaligned if the stacking device determines that the number of diaphragm image sub-regions in the target image is 1; and under a condition that the above-mentioned first diaphragm 20 and second diaphragm 30 are aligned with respect to the above-mentioned anode electrode plate 10, in an image captured by the photographing device, the image regions corresponding to the diaphragms may include the double-layer diaphragm region 41 and the single-layer diaphragm region 42, that is, the above-mentioned second preset number may be set as 2, then it is determined that the diaphragms of the electrode plate to be detected are misaligned if the stacking device determines that the number of diaphragm image sub-regions in the target image is 2.

It should be noted that there may be no diaphragm in the electrode plate to be detected during the production process of the battery electrode plate, for example, since a diaphragm roll for transporting the first diaphragm 10 and the second diaphragm 20 to the position A is exhausted and not replaced in time.

In some implementations, the method further includes: under a condition that the number of diaphragm image sub-regions in the target image is a third preset number, outputting fault prompt information, wherein the third preset number is different from the first preset number and the second preset number.

In the implementations, under a condition that the number of diaphragm image sub-regions in the target image is a third preset number, the stacking device may output fault prompt information to remind for timely troubleshooting and reduce a defective rate of battery electrode plates.

The above-mentioned output of fault prompt information may be realized through at least one of a warning light, display information, and voice broadcast.

The above-mentioned third preset number is different from the first preset number and the second preset number, and under a condition that the number of diaphragm image sub-regions is the third preset number, the stacking device may determine that there is no diaphragm in the electrode plate to be detected.

For example, since there is no diaphragm image sub-region corresponding to the diaphragms in the target image under a condition that there is no diaphragm in the electrode plate to be detected, that is, the third preset number is 0, if the number of diaphragm image sub-regions in the target image is 0, then the stacking device may display a "NG" mark on its display interface to prompt an operator to shut down.

In some implementations, after the performing diaphragm misalignment detection on the electrode plate to be detected based on the target image region, the method further includes: under a condition that it is detected that the diaphragms of the electrode plate to be detected are misaligned, determining a misalignment amount of the diaphragms in the electrode plate to be detected based on the target image region.

In the implementations, under a condition that it is detected that the diaphragms of the electrode plate to be detected are misaligned, the stacking device may determine a misalignment amount of the diaphragms in the electrode plate to be detected based on the target image region, so that the misalignment amount can intuitively reflect the misalignment of the electrode plate to be detected, and provide a reference for subsequent production.

Under a condition that it is detected that the diaphragms of the electrode plate to be detected are misaligned, determining a misalignment amount of the diaphragms in the electrode plate to be detected based on the target image region may include: under a condition that it is determined that the diaphragms of the electrode plate to be detected are misaligned based on the number of diaphragm image sub-regions in the target image region, determining a misalignment amount of the diaphragms in the electrode plate to be detected based on the target image region.

For the above-mentioned determining a misalignment amount of the diaphragms in the electrode plate to be detected based on diaphragm image sub-regions in the target image, the stacking device may acquire a single-layer diaphragm region including the anode electrode plate and the diaphragm on one side, then determine a number of pixel points of the single-layer diaphragm region in a width direction, and according to the number of pixel points, determine the misalignment amount of the diaphragms in the electrode plate to be detected.

The misalignment amount of the diaphragms may be a width value in the width direction perpendicular to the transport direction of the electrode plate to be detected, and the misalignment amount is configured to reflect a misalignment size of the diaphragms on two sides of the electrode plate to be detected.

In some implementations, under a condition that it is detected that the diaphragms of the electrode plate to be detected are misaligned, determining a misalignment amount of the diaphragms in the electrode plate to be detected based on the target image region includes: under a condition that it is detected that the diaphragms of the electrode plate to be detected are misaligned, determining a single-layer diaphragm region and a double-layer diaphragm region in diaphragm image sub-regions of the target image; performing edge detection on the single-layer diaphragm region and the double-layer diaphragm region respectively, to obtain a first region edge of the single-layer diaphragm region and a second region edge of the double-layer diaphragm region, wherein the second region edge corresponds to the first region edge; and determining a spacing between the first region edge and the second region edge as the misalignment amount of the diaphragms in the electrode plate to be detected.

In the implementations, under a condition that the diaphragms of the electrode plate to be detected are misaligned, by acquiring corresponding first region edge and second region edge in the single-layer diaphragm region and the double-layer diaphragm region of the target image, and determining a spacing between the first region edge and the second region edge as the misalignment amount of the diaphragms in the electrode plate to be detected, the determined misalignment amount of the diaphragms is enabled to be more accurate.

The above-mentioned determining a single-layer diaphragm region and a double-layer diaphragm region in diaphragm image sub-regions of the target image may include: after performing grayscale processing on the target image region, determining a single-layer diaphragm region and a double-layer diaphragm region according to the grayscale of each diaphragm image sub-region in the target image region. Since a single-layer diaphragm has a higher light transmittance than a double-layer diaphragm, a grayscale of the single-layer diaphragm region is usually lower than that of the double-layer diaphragm region.

The second region edge corresponds to the first region edge, which may indicate that: there may be two region edges respectively connected to the single-layer diaphragm region in the width direction.

For example, as shown in FIG. 4, after the stacking device determines the above-mentioned double-layer diaphragm region 41 and single-layer diaphragm region 42, the stacking device may detect an edge 411 (i.e., the second region edge) of the double-layer diaphragm region 41, and detect an edge 421 (i.e., the first region edge) of the single-layer diaphragm region 42, and determine a spacing between the edge 411 and the edge 421 as the misalignment of the diaphragms.

In some implementations, the method further includes: acquiring a third region edge, wherein the third region edge is an edge of an image region corresponding to the anode electrode plate or a cathode electrode plate in the target image, and the third region edge corresponds to the second region edge; and determining a spacing between the third region edge and the second region edge.

In the implementations, the stacking device may further acquire a third region edge of an image region corresponding to the anode electrode plate or the cathode electrode plate, and determine a spacing between the third region edge and the second region edge, so that a spacing between an edge of a double-layer diaphragm in the target image and an edge of the anode electrode plate or the cathode electrode plate can be determined, so as to control the production of the battery electrode plate based on the spacing.

The above acquisition of the third region edge may be performed under a condition that the stacking device determines that there is a misalignment of the electrode plate to be detected; or may also be performed under a condition that the stacking device determines that there is no misalignment of the electrode plate to be detected, which is not limited herein.

For example, as shown in FIG. 4, under a condition that the above-mentioned target image includes the double-layer diaphragm region 41 and the single-layer diaphragm region 42, the stacking device may also acquire an edge 431 (i.e., the third region edge) of an image region 43 corresponding to the anode electrode plate, and determine a spacing between the edge 431 and the edge 421, and finally upload the spacing between the edge 431 and the edge 421, the spacing between the edge 421 and the edge 411 to a processor of the stacking device, so as to control the production of the battery electrode plate based on the obtained two spacings.

Figure 5:
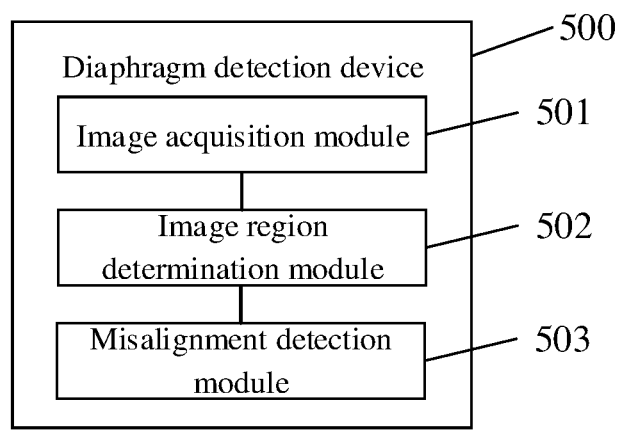
FIG. 5 is a schematic structural diagram of an embodiment of a diaphragm detection device provided by the present application.

Please refer to FIG. 5, which is a schematic structural diagram of an embodiment of a diaphragm detection device provided by the present application. As shown in FIG. 5, the diaphragm detection device 500 includes: an image acquisition module 501 configured to acquire a target image of an electrode plate to be detected, wherein the electrode plate to be detected includes an anode electrode plate and diaphragms respectively stacked on two sides of the anode electrode plate; an image region determination module 502 configured to perform image processing on the target image to determine a target image region in the target image, wherein the target image region includes an image region corresponding to the diaphragms; and a misalignment detection module 503 configured to perform diaphragm misalignment detection on the electrode plate to be detected based on the target image region.

In the embodiments of the present application, the target image of the electrode plate to be detected is acquired, image processing is performed on the target image to determine a target image region corresponding to the diaphragms in the target image, and based on the target image region, misalignment detection is performed on the diaphragms in the electrode plate to be detected. In this way, based on the image region corresponding to the diaphragms in the image of the electrode plate to be detected, it is possible to detect whether the diaphragms in the electrode plate to be detected are misaligned. Compared with determining the misalignment of the diaphragms through human experience, not only the accuracy of detection can be improved, but also the detection efficiency can be improved.

In some implementations, the misalignment detection module 503 includes: a region number acquisition unit configured to acquire a number of diaphragm image sub-regions in the target image region; and a misalignment result determination unit configured to determine a diaphragm misalignment result of the electrode plate to be detected based on the number of diaphragm image sub-regions in the target image region, wherein the diaphragm misalignment result is configured to indicate whether the diaphragms of the electrode plate to be detected are misaligned.

In the implementations, by acquiring a number of diaphragm image sub-regions in the target image region, and determining a diaphragm misalignment result of the electrode plate to be detected based on the number of diaphragm image sub-regions in the target image region, in the process of detecting whether the diaphragms of the electrode plate to be detected are misaligned, it is possible to make the detection process simpler, thereby saving computing resources and improving the detection speed.

In some implementations, the region number acquisition unit is specifically configured to: perform grayscale image segmentation processing on the target image region to obtain a number N of diaphragm image sub-regions with different grayscales, where N is a positive integer, wherein N is the number of diaphragm image sub-regions in the target image.

In the implementations, by performing grayscale image segmentation processing on the target image region, and determining the number of diaphragm image sub-regions according to different grayscales in the target image region, the process of determining the number of diaphragm image sub-regions in the target image is enabled to be simpler and more accurate.

In some implementations, the misalignment result determination unit includes: a first sub-result determination sub-unit configured to: under a condition that the number of diaphragm image sub-regions in the target image is a first preset number, determine that the diaphragm misalignment result of the electrode plate to be detected is a first sub-result, wherein the first sub-result is configured to indicate that the diaphragms of the electrode plate to be detected are not misaligned; and a second sub-result determination sub-unit configured to: under a condition that the number of diaphragm image sub-regions in the target image is a second preset number, determine that the diaphragm misalignment result of the electrode plate to be detected is a second sub-result, wherein the second preset number is different from the first preset number, and the second sub-result is configured to indicate that the diaphragms of the electrode plate to be detected are misaligned.

In the implementations, by comparing the number of diaphragm image sub-regions in the target image with the first preset number and the second preset number respectively, the first sub-result and the second sub-result respectively configured to indicate that whether the diaphragms of the electrode plate to be detected are misaligned can be respectively obtained, thereby making it easier and faster to determine whether the diaphragms of the electrode plate to be detected are misaligned.

In some implementations, the device further includes: a prompt information output module configured to: under a condition that the number of diaphragm image sub-regions in the target image is a third preset number, output fault prompt information, wherein the third preset number is different from the first preset number and the second preset number.

In the implementations, under a condition that the number of diaphragm image sub-regions in the target image is a third preset number, a stacking device may output fault prompt information to remind for timely troubleshooting and reduce a defective rate of battery electrode plates.

In some implementations, the device further includes: a misalignment amount determination module configured to: under a condition that it is detected that the diaphragms of the electrode plate to be detected are misaligned, determine a misalignment amount of the diaphragms in the electrode plate to be detected based on the target image region.

In the implementations, under a condition that it is detected that the diaphragms of the electrode plate to be detected are misaligned, the stacking device may determine a misalignment amount of the diaphragms in the electrode plate to be detected based on the target image region, so that the misalignment amount can intuitively reflect the misalignment of the electrode plate to be detected, and provide a reference for subsequent production.

In some implementations, the misalignment amount determination module includes: a diaphragm region determination unit configured to: under a condition that it is detected that the diaphragms of the electrode plate to be detected are misaligned, determine a single-layer diaphragm region and a double-layer diaphragm region in the diaphragm image sub-regions of the target image; an edge detection unit configured to: perform edge detection on the single-layer diaphragm region and the double-layer diaphragm region respectively, to obtain a first region edge of the single-layer diaphragm region and a second region edge of the double-layer diaphragm region, wherein the second region edge corresponds to the first region edge; and a misalignment amount determination unit configured to: determine a spacing between the first region edge and the second region edge as the misalignment amount of the diaphragms in the electrode plate to be detected.

In the implementations, under a condition that the diaphragms of the electrode plate to be detected are misaligned, by acquiring corresponding first region edge and second region edge in the single-layer diaphragm region and the double-layer diaphragm region of the target image, and determining a spacing between the first region edge and the second region edge as the misalignment amount of the diaphragms in the electrode plate to be detected, the determined misalignment amount of the diaphragms is enabled to be more accurate.

In some implementations, the device further includes: an edge acquisition module configured to acquire a third region edge, wherein the third region edge is an edge of an image region corresponding to the anode electrode plate or a cathode electrode plate in the target image, and the third region edge corresponds to the second region edge; and a spacing determination module configured to determine a spacing between the third region edge and the second region edge.

In the implementations, the stacking device may further acquire a third region edge of an image region corresponding to the anode electrode plate or a cathode electrode plate, and determine a spacing between the third region edge and the second region edge, so that a spacing between an edge of a double-layer diaphragm in the target image and an edge of the anode electrode plate or the cathode electrode plate can be determined, so as to control the production of the battery electrode plate based on the spacing.

Other details of the diaphragm detection device according to the embodiments of the present application are similar to the diaphragm detection method described above in conjunction with the embodiments shown in FIG. 2, and the diaphragm detection device can achieve corresponding technical effects, which are not repeated herein for the sake of brevity.

Figure 6:
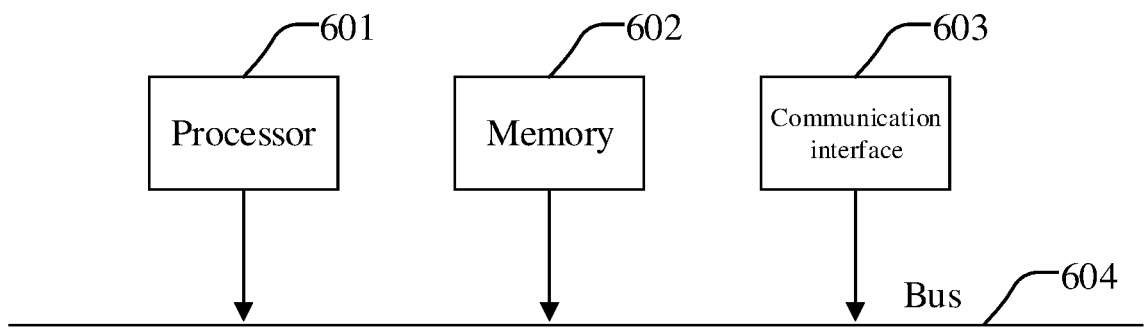
FIG. 6 is a schematic diagram of a hardware structure of an embodiment of a stacking device provided by the present application.

Please refer to FIG. 6, which is a schematic diagram of a hardware structure of an embodiment of a stacking device provided by the present application.

The stacking device may include a processor 601 and a memory 602 storing computer program instructions.

Specifically, the processor 601 described above may include a central processing unit (CPU), or an application specific integrated circuit (ASIC), or one or more integrated circuit(s) configured to implement the embodiments of the present application.

The memory 602 may include mass memory for data or instructions. As an example but not as a limitation, the memory 602 may include a hard disk drive (HDD), a floppy disk drive, a flash memory, an optical disk, a magneto-optical disk, a magnetic tape, or a universal serial bus (USB) drive or a combination of two or more of the above. In some instances, the memory 602 may include removable or non-removable (or fixed) media, or the memory 602 may be a non-volatile solid state memory. In some embodiments, the memory 602 may be internal or external to the battery apparatus.

In some instances, the memory 602 may be a read-only memory (ROM). In an instance, the ROM can be a mask programmed ROM, a programmable ROM (PROM), an erasable PROM (EPROM), an electrically erasable PROM (EEPROM), an electrically alterable ROM (EAROM), or a flash memory, or a combination of two or more of the above.

The memory 602 may include a read only memory (ROM), a random access memory (RAM), a magnetic disk storage media device, an optical storage media device, a flash memory device, an electrical, optical or other physical/tangible memory storage device. As a result, generally, the memory includes one or more tangible (non-transitory) computer-readable storage media (for example, memory devices) encoded with software including computer-executable instructions, and when the software is executed (for example, by one or more processors), the software is operable to perform the operations described with reference to methods according to one aspect of the present disclosure.

The processor 601, by reading and executing computer program instructions stored in the memory 602, implements the method in the embodiments shown in FIG. 2 and achieves corresponding technical effects achieved by performing the methods/steps in the instances shown in FIG. 2, which are not repeated herein for brevity.

In one example, the stacking device may further include a communication interface 603 and a bus 604. As shown in FIG. 6, the processor 601, the memory 602, and the communication interface 603 are connected through the bus 604 and achieve mutual communication.

The communication interface 603 is mainly configured to achieve communication between various modules, apparatuses, units and/or devices in the embodiments of the present application.

The bus 604 includes hardware, software, or both, and couples components of an online data traffic charging device to each other. As an example rather than limitation, the bus may include an Accelerated Graphics Port (AGP) or other graphics buses, an Extended Industry Standard Architecture (EISA) bus, a Front Side Bus (FSB), a Hyper Transport (HT) interconnect, an Industry Standard Architecture (ISA) bus, a wireless band interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus or other suitable buses or a combination of two or more of the above. When appropriate, the bus 604 may include one or more buses. Although the embodiments of the present application describe and illustrate a particular bus, any suitable bus or interconnect may be considered in the present application.

The stacking device may perform the diaphragm detection method in the embodiments of the present application, thereby implementing the diaphragm detection method and device described in conjunction with FIG. 2.

In addition, in conjunction with the diaphragm detection method and device in the embodiments above, the embodiments of the present application may provide a computer storage medium for implementation. Computer program instructions are stored on the computer storage medium; the computer program instructions, when are executed by a processor, implement any battery and control method thereof in the embodiments above.

It should be noted that, the present application is not limited to the specific configurations and processing described above and shown in the figures. For the sake of brevity, detailed description of known methods are omitted herein. In the above embodiments, several specific steps are described and shown as examples. However, the method process of the present application is not limited to the specific steps described and shown, and those skilled in the art can make various changes, modifications and additions, or change the order of steps after comprehending the gist of the present application.

The functional blocks shown in the structural block diagram above may be implemented as hardware, software, firmware, or a combination thereof. When implemented as hardware, it can be, for example, an electronic circuit, an application specific integrated circuit (ASIC), suitable firmware, a plug-in, a functional card, and the like. When implemented as software, elements of the present application are programs or code segments used to perform required tasks. The programs or code segments can be stored in a machine-readable medium, or transmitted on a transmission medium or a communication link through a data signal carried in a carrier wave. A "machine-readable medium" can include any medium that can store or transmit information. An example of the machine-readable medium includes an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and the like. The code segments can be downloaded via a computer network such as the Internet, intranet, and the like.

It should also be noted that, according to the exemplary embodiments described in the present application, some methods or systems are described based on a series of steps or apparatuses. However, the present application is not limited to the above order of the steps, that is, the steps can be performed in the order described in the embodiments or in orders different from that in the embodiments, or several steps can be performed at the same time.

Aspects of the present disclosure are described above with reference to flowchart illustrations and/or block diagrams of methods, apparatuses, devices and computer program products according to the embodiments of the present disclosure. It should be understood that each block of the flowchart illustrations and/or the block diagrams, and a combination of various blocks of the flowchart illustrations and/or the block diagrams can be implemented by computer program instructions. These computer program instructions can be provided to a processor of a general purpose computer, a special purpose computer, or other programmable data processing apparatuses to produce a machine such that execution of the instructions via the processor of the computer or other programmable data processing apparatuses enables the implementation of the functions/actions specified in one or more blocks of the flowchart illustrations and/or block diagrams. Such processor can be but is not limited to a general purpose processor, a special purpose processor, an application specific processor, or a field programmable logic circuit. It should also be understood that each block of the block diagrams and/or the flowchart illustrations, and the combination of blocks of the block diagrams and/or the flowchart illustrations can also be implemented by special purpose hardware that performs specified functions or actions, or by a combination of the special purpose hardware and computer instructions.

Finally, it should be noted that the above embodiments are merely intended to describe the technical solutions of the present application instead of limiting the present application. Although the present application is described in detail with reference to the above embodiments, those of ordinary skill in the art should understand that they can still make modifications to the technical solutions recited in the above embodiments, or make equivalent replacements to some or all of the technical features in the technical solutions. These modifications or replacements do not make the essence of corresponding technical solutions depart from the scope of the technical solutions of various embodiments of the present application, and should be encompassed in the scope of the claims and description of the present application. In particular, various technical features mentioned in various embodiments can be combined in any manner as long as there is no structural conflict. The present application is not limited to the specific embodiments disclosed herein, and includes all technical solutions that fall within the scope of the claims.

What is claimed is:

1. A diaphragm detection method, comprising:
   acquiring a target image of an electrode plate to be detected, wherein the electrode plate to be detected comprises an anode electrode plate and diaphragms respectively stacked on two sides of the anode electrode plate;
   performing image processing on the target image to determine a target image region in the target image; and
   performing diaphragm misalignment detection on the electrode plate to be detected based on the target image region, comprising:
      acquiring a number of diaphragm image sub-regions in the target image region, comprising:
         performing grayscale image segmentation processing on the target image region to obtain a number N of diaphragm image sub-regions with different grayscales, where N is a positive integer and represents the number of diaphragm image sub-regions in the target image; and
      determining a diaphragm misalignment result of the electrode plate to be detected based on the number of diaphragm image sub-regions in the target image region, wherein the diaphragm misalignment result is configured to indicate whether the diaphragms of the electrode plate to be detected are misaligned.

2. The method of claim 1, wherein determining the diaphragm misalignment result of the electrode plate to be detected based on the number of diaphragm image sub-regions in the target image region comprises:
   under a condition that the number of diaphragm image sub-regions in the target image is a first preset number, determining that the diaphragm misalignment result of the electrode plate to be detected is a first sub-result, wherein the first sub-result is configured to indicate that the diaphragms of the electrode plate to be detected are not misaligned; and
   under a condition that the number of diaphragm image sub-regions in the target image is a second preset number, determining that the diaphragm misalignment result of the electrode plate to be detected is a second sub-result, wherein the second preset number is different from the first preset number, and the second sub-result is configured to indicate that the diaphragms of the electrode plate to be detected are misaligned.

3. The method of claim 2, further comprising:
   under a condition that the number of diaphragm image sub-regions in the target image is a third preset number, outputting fault prompt information, wherein the third preset number is different from the first preset number and the second preset number.

4. The method of claim 1, further comprising, after performing diaphragm misalignment detection on the electrode plate to be detected based on the target image region:
   under a condition that it is detected that the diaphragms of the electrode plate to be detected are misaligned, determining a misalignment amount of the diaphragms in the electrode plate to be detected based on the target image region.

5. The method of claim 4, wherein determining the misalignment amount of the diaphragms in the electrode plate to be detected based on the target image region comprises:
- determining a single-layer diaphragm region and a double-layer diaphragm region in diaphragm image sub-regions of the target image, wherein the single-layer diaphragm region is a diaphragm image sub-region of the anode electrode plate and a diaphragm on one side and the double-layer diaphragm region is a diaphragm image sub-region of the anode electrode plate and the diaphragms on both sides;
- performing edge detection on the single-layer diaphragm region and the double-layer diaphragm region, to obtain a first region edge of the single-layer diaphragm region and a second region edge of the double-layer diaphragm region, wherein the second region edge corresponds to the first region edge; and
- determining a spacing between the first region edge and the second region edge as the misalignment amount of the diaphragms in the electrode plate to be detected.

6. The method of claim 5, further comprising:
- acquiring a third region edge, wherein the third region edge is an edge of an image region corresponding to the anode electrode plate or a cathode electrode plate in the target image, and the third region edge corresponds to the second region edge; and
- determining a spacing between the third region edge and the second region edge.

7. A non-transitory readable storage medium having stored programs or instructions thereon, wherein the programs or instructions, when executed by a processor, implement the diaphragm detection method of claim 1.

8. A diaphragm detection device, comprising:
- an image acquisition module configured to acquire a target image of an electrode plate to be detected, wherein the electrode plate to be detected comprises an anode electrode plate and diaphragms respectively stacked on two sides of the anode electrode plate;
- an image region determination module configured to perform image processing on the target image to determine a target image region in the target image; and
- a misalignment detection module configured to perform diaphragm misalignment detection on the electrode plate to be detected based on the target image region, wherein the misalignment detection module comprises:
  - a region number acquisition unit configured to acquire a number of diaphragm image sub-regions in the target image region, and is specifically configured to:
    - perform grayscale image segmentation processing on the target image region to obtain a number N of diaphragm image sub-regions with different grayscales, where N is a positive integer and represents the number of diaphragm image sub-regions in the target image; and
  - a misalignment result determination unit configured to determine a diaphragm misalignment result of the electrode plate to be detected based on the number of diaphragm image sub-regions in the target image region, wherein the diaphragm misalignment result is configured to indicate whether the diaphragms of the electrode plate to be detected are misaligned, and the misalignment result determination unit comprises:
    - a first sub-result determination sub-unit configured to: under a condition that the number of diaphragm image sub-regions in the target image is a first preset number, determine that the diaphragm misalignment result of the electrode plate to be detected is a first sub-result, wherein the first sub-result is configured to indicate that the diaphragms of the electrode plate to be detected are not misaligned; and
    - a second sub-result determination sub-unit configured to: under a condition that the number of diaphragm image sub-regions in the target image is a second preset number, determine that the diaphragm misalignment result of the electrode plate to be detected is a second sub-result, wherein the second preset number is different from the first preset number, and the second sub-result is configured to indicate that the diaphragms of the electrode plate to be detected are misaligned.

9. The device of claim 8, further comprising:
- a prompt information output module configured to: under a condition that the number of diaphragm image sub-regions in the target image is a third preset number, output fault prompt information, wherein the third preset number is different from the first preset number and the second preset number.

10. The device of claim 9, further comprising:
- a misalignment amount determination module configured to: under a condition that it is detected that the diaphragms of the electrode plate to be detected are misaligned, determine a misalignment amount of the diaphragms in the electrode plate to be detected based on the target image region.

11. The device of claim 10,
wherein the misalignment amount determination module comprises:
- a diaphragm region determination unit configured to: under a condition that it is detected that the diaphragms of the electrode plate to be detected are misaligned, determine a single-layer diaphragm region and a double-layer diaphragm region in the diaphragm image sub-regions of the target image, wherein the single-layer diaphragm region is a diaphragm image sub-region of the anode electrode plate and a diaphragm on one side and the double-layer diaphragm region is a diaphragm image sub-region of the anode electrode plate and the diaphragms on both sides;
- an edge detection unit configured to: perform edge detection on the single-layer diaphragm region and the double-layer diaphragm region, to obtain a first region edge of the single-layer diaphragm region and a second region edge of the double-layer diaphragm region, wherein the second region edge corresponds to the first region edge; and
- a misalignment amount determination unit configured to: determine a spacing between the first region edge and the second region edge as the misalignment amount of the diaphragms in the electrode plate to be detected;

the device further comprising:
- an edge acquisition module configured to acquire a third region edge, wherein the third region edge is an edge of an image region corresponding to the anode electrode plate or a cathode electrode plate in the target image, and the third region edge corresponds to the second region edge; and a spacing determination module configured to determine a spacing between the third region edge and the second region edge.

\* \* \* \* \*